United States Patent Office 3,847,969
Patented Nov. 12, 1974

3,847,969
DIASTEREOMERS OF ESTERS AND SALTS OF α-HYDRAZINO-β-(PHENYL)PROPIONIC ACID
Sandor Karady, Elizabeth, Seemon H. Pines, Murray Hill, Manuel G. Ly, Edison, and Meyer Sletzinger, North Plainfield, N.J., assignors to Merck & Co. Inc., Rahway, N.J.
No Drawing. Original application June 24, 1970, Ser. No. 49,542, now Patent No. 3,718,678. Divided and this application Nov. 15, 1971, Ser. No. 199,060
Int. Cl. C07c 109/10
U.S. Cl. 260—471 A    3 Claims

ABSTRACT OF THE DISCLOSURE

Diastereomers of and a method of resolving α-hydrazino-β-(substituted or unsubstituted phenyl)alkanoic acid derivatives.

---

This is a division of application Ser. No. 49,542, filed June 24, 1970, now Pat. No. 3,718,678. The present invention relates to novel and useful chemical compounds and to a process for their preparation. More particularly, it relates to chemical diastereomers which can be separated.

It is known in the art that various α-hydrazino-β-(substituted or unsubstituted phenyl)alkanoic acids are useful as decarboxylase inhibitors (see U.S. Pat. No. 3,462,536). In general, one stereoisomer of the racemate is more desirable than the other. This is due to the fact that even in such closely related compounds there are variations in activity, toxicity, side effects and the like due to the stereo configuration. In an attempt to separate the stereoisomers by the formation of diastereomeric salts, difficulties are encountered since the materials would not precipitate from solution. Accordingly, it was thought that perhaps all closely related hydrazine compounds would react in the same way. It has now been found that some of these materials will crystallize from solution as diastereomers. It has further been found that when these diastereomers are converted to other diastereomeric salts, the second diastereomers can be used as seed crystals to precipitate the previously inseparable diastereomers.

It is an object of the present invention to prepare novel intermediates. A further object is to provide a process for the formation of such intermediates. A still further object is to provide a process for forming diastereomer intermediates which can be separated. A further object is to provide a process whereby the separate diastereomers may be formed into useful final products. Other objects will become apparent as the description of the invention proceeds.

These objects are accomplished by the present invention which provides a diastereomer of a compound of the formula

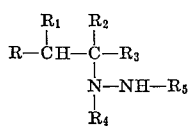

wherein

R is a substituted or unsubstituted phenyl radical containing less than about 25 carbon atoms;
$R_1$ and $R_2$ are hydrogen or lower alkyl;
$R_3$ is —CN, —$CONH_2$, —COOH, —COOlower alkyl or —COOcation; and
$R_4$ and $R_5$ are hydrogen or acyl with an optically active acid or base.

In a preferred embodiment of the present invention, R is a substituted phenyl radical preferably a 3-substituted, a 4-substituted or a 3,4-disubstituted phenyl radical. Preferably the substituents are alkoxy, aryloxy, aralkyloxy, hydroxy or esterified hydroxy groups. Such substituents include methox, ethoxy, phenyloxy, benzyloxy and hydroxy groups esterified with lower alkanoic acids, benzoic acid and the like. In another preferred embodiment of the present invention, $R_1$ and $R_2$ are either hydrogen or methyl.

The present invention also provides a process for resolving a compound of the formula

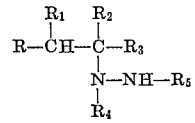

wherein

R is a substituted or unsubstituted phenyl radical containing less than about 25 carbon atoms;
$R_1$ and $R_2$ are hydrogen or lower alkyl;
$R_3$ is —CN, —$CONH_2$, —COOH, —COOlower alkyl or —COOcation; and
$R_4$ and $R_5$ are hydrogen or acyl which comprises forming a diastereomer of the compound with an optically active acid or base and separating the diastereomers. When $R_5$ is acyl, it is preferred that $R_3$ be —COOH.

In forming the diastereomers of the present invention, any of the conventional solvents may be used. The hydrazine compound is dissolved in the solvent along with the optically active acid or base. The diastereomers which are formed can be separated by any of the conventional means, namely fractional crystallization (with or without seeding), ion exchange resins and the like. Suitable solvents for dissolving the diastereomers include water, methanol, ethanol, ethyl acetate, diethylether, hexane, chloroform, methylene chloride and the like. The diastereomers can be formed employing any temperature but in general they are formed at room temperature and then cooled to fractionally crystallize one of the diastereomers. Seeding of the solution generally hastens crystallization and frequently gives improved yields.

In some instances, it is desirable to add protecting groups to the compound prior to forming the salt with the optically active acid or base. For example, when using brucine, it is sometimes desirable to esterify the hydroxyl groups with acetyl or benzoyl groups. In addition, the amino groups can be protected by the use of N-acyl groups. After the formation of the diastereomer, the solution can be acidified with HCl to form the soluble brucine HCl salt and the insoluble acetyl derivatives will precipitate from solution. If desired, the acyl groups may be removed by conventional hydrolysis employing HCl or other hydrohalic acid at a temperature of from about 75° to about 175° C.

While any optically active acid or base can be used to form the diastereomers, it is of course preferred to use the more readily available, less expensive materials. Among the various optically active acids which can be used are the d or l form of camphoric acid, camphorsulfonic acid, dibenzoyltartaric acid, ditolyltartaric acid, malic acid, pyroglutamic acid, α-methyl-α-phenylacetic acid, atrolactic, menthoxyacetic acid, or the like. Derivatives of such d or l acids may also be used. Other natural acids containing a natural stereo configuration such as cholic acid may also be employed. The various optically active bases which can be used include α-phenethylamine, brucine, strychnine, ephedrine, quinine, quinidine, cinchonine, cinchonidine, morphine and the like.

In referring to steroisomers, it should be noted that a distinction is made between absolute configuration and optical rotation. The use of the D or L refers to absolute configuration which may differ from or be the same as the d or l of the optical rotation. Similarly, the d or l refers to optical rotation and does not refer to absolute configuration. In other words, when $l$ is given the compound is levorotatory and when $d$ is given the compound is dextrorotatory. Since the D and L are not related to optical rotation but rather to steric configuration, these letters do not indicate the direction of rotation. In the following discussions, the L and D refer to the hydrazine compound since the absolute configurations of these compounds are known and generally used in the art. In contrast, the optically active acids or bases are generally known and given the $l$ or $d$ designation depending upon their optical rotation. Since this is conventional, it followed in the discussion and examples.

After forming the salt with optically active acid or base, it is to be noted that the product is now a diastereomer containing at least two asymmetric carbon atoms. Since only one optical isomer of the acid or base is used, the diastereomer contains one of the two following A or B pairs; (A) L $d$ and D $d$ or (B) L $l$ and D $l$—with D or L referring to the absolute stereo configuration of the hydrazine compound and $d$ and $l$ referring to the optical rotation of the acid or base. Thus, when the $d$ acid or base is used, the diastereomers will be pair (A) above and when the $l$ compound is used, the diastereomer will be pair (B). The diastereomer in each of the pairs will now have sufficiently different properties so as to be separated by conventional means. In general, the diastereomers are separated from the mixture by fractional crystallization (either with or without seeding), chromatography or by other conventional means of resolution. While seeding of a supersaturated solution of the mixture is the preferred method of separation, it is obvious that some resolution must first occur before any seed crystals are available. With seed crystals, the process can be speeded considerably and increased yields are generally obtained.

After resolution of the mixture into its diastereomers, each of the diastereomers can be neutralized with aqueous acid or base under moderate conditions to form the final product.

The expression "unsubstituted phenyl" merely signifies the

radical containing no substituents and the term "substituted" signifies such a ring containing other organic radicals attached to the ring as hereinbefore pointed out. In a preferred embodiment of the present invention, R contains less than 25 carbon atoms and is a 3,4-disubstituted phenyl radical wherein the substituents can be converted to hydroxyl groups. The "lower alkyl" radical signifies an alkyl group containing from 1 to about 6 carbon atoms which can be straight chained or branched. The term "cation" is used in its conventional sense to mean any inorganic or organic, positively charged atom or radical. It includes the cations from such basic materials as calcium hydroxide, sodium hydroxide, potassium hydroxide, etc. as well as the cations from cyclohexylamine, triethylamine, phenethylamine and the like. Such bases react with the carboxyl group of the hydrazine compound to form salts of the structure given in the formula. The "acyl" radical is any organic radical derived from an organic acid by the removal of the hydroxyl group. It includes such radicals derived from lower alkanoic acids, benzoic acid as well as other carboxylic acids, sulfonic acids and the like. Preferably the acyl radical contains less than about 25 carbon atoms.

The following examples are given to illustrate the invention and are not intended to limit it in any manner. All parts are given in parts by weight unless otherwise expressed. Where a reactant is given the L, D, $l$ or $d$ designation, it signifies that the reactant is substantially 100% in the indicated stereo configuration or optical form.

EXAMPLE 1

Preparation of L-β-(3,4-dihydroxyphenyl)-α-hydrazinopropionic acid

A mixture of 50 g. (0.362 mole) of 3,4-dihydroxybenzaldehyde, 50 g. (0.375 mole) of rhodanine and 75 g. (0.915 mole) of anhydrous sodium acetate in 200 ml. of acetic acid is heated at reflux with stirring for 30 minutes. During the period of reflux crystalline product comes down, and some hydrogen sulfide gas is evolved. The reaction mixture is poured into 1 liter of boiling water, stirred at 95–100° for 10 minutes, and then is cooled to 20°. The product is filtered, washed with 4× 125 ml. of water and dried under vacuum at 50°. The product is cis-trans-2-thio-4-keto-5-(3′,4′-dihydroxybenzylidenethiazolidine).

Fifty grams (0.197 mole) of 3,4-dihydroxybenzylidene rhodanine is dissolved in 200 ml. of water containing 60 g. (1.5 moles) of sodium hydroxide. The system is evacuated and flushed with nitrogen several times before the rhodanine derivative is added. The solution is heated on the steam bath for 15 minutes (the temperature is above 90° for 10 minutes) and is then rapidly cooled in a Dry Ice®-acetone bath to −15°. The frozen slurry is then treated with 150 ml. of concentrated hydrochloric acid all at once and stirred vigorously. After cooling to 5°, the product is filtered, washed with 4× 50 ml. of ice water, and dried under vacuum at 45°. The product is cis-trans-α-mercapto-3,4-dihydroxycinnamic acid.

Thirty grams (0.141 mole) of crude mercaptodihydroxycinnamic acid is dissolved in 60 ml. of ethanol under nitrogen with stirring. Upon the addition of 9.2 ml. (9.2 g., 0.273 mole) of 95% hydrazine over the course of 5 minutes, the reaction mixture becomes warm and hydrogen sulfide is evolved. A heavy oil separates and crystallizes within 15 minutes. Ethanol (60 ml.) is added, and the stirred slurry is refluxed for 15 minutes. The reaction mixture is cooled to 20°, filtered, washed with 4× 50 ml. of ethanol and 2× 50 ml. of ether, and dried under vacuum at 45°. The product is syn-anti-α-hydrazono-β-(3,4-dihydroxyphenyl)propionic acid hydrazine salt.

A solution of 44.5 g. (0.184 mole) of crude hydrazine salt in 400 ml. of water is treated with 810 g. of 3% sodium in mercury (Inorganic Syntheses I, 10). The reaction mixture becomes warm (40°) and is cooled to 25° with a water bath. The mixture is stirred under nitrogen at room temperature until all the amalgam has reacted (ca. 24 hours) as evidenced by the mercury layer being perfectly liquid and containing no solids. The aqueous layer is decanted and adjusted to pH 5 by the addition of 65 ml. of concentrated hydrochloric acid and 25 ml. of 2.5 N hydrochloric acid. The solution is filtered through Super-Cel to remove a little white oil and then concentrated under vacuum to about 250 ml. After standing at 0–5° for 4 hours, the heavy precipitate is filtered off, washed with 3× 75 ml. of water and dried under vacuum at 50°. The product is D,L-α-hydrazino-β-(3,4-dihydroxyphenyl)propionic acid.

The crude product (34 g.) is dissolved in 500 ml. of boiling water, filtered to remove a small amount of insolubles. The crystalline product is filtered, washed with water and dried under vacuum to give 12.4 g. of greyish product. In the same manner the product is recrystallized again from 150 ml. of water to give 8.4 g. of light grey product, m.p. 195°.

U.V. $\lambda_{2800}^{H_2O}$ 153, $\lambda_{2800}^{0.1N\ HCl}$ 131;

Anal.—Calcd. for $C_9H_{12}N_2O_4$: C, 50.94; H, 5.70; N, 13.20; Eq. Wt. 212.2. Found: C, 50.75; H, 5.61; N, 12.95; Eq. Wt. 214.

To D,L-β-(3,4-dihydroxyphenyl)-α-hydrazinopropionic acid (212.2 g., 1.0 mole) in pyridine (2 l.) is added dropwise over 2 hours with stirring and some cooling acetic anhydride (1 l.). The mixture is heated on the steam bath for 6 hours at 90–95°, cooled, concentrated to dryness *in vacuo* and taken up in chloroform-water. The chloroform extract is washed successively with 0.1 N hydrochloric acid, water and saturated salt solution, dried (MgSO$_4$) and concentrated to dryness *in vacuo*. The foamy residue crystallizes on trituration with methyl-cyclohexane and is recrystallized from ethylacetate-n-hexane to yield D,L-β-(3,4-diacetoxyphenyl)-α-N$^1$,N$^2$-diacetylhydrazinopropionic acid.

The ester (304.0 g., 0.8 mole) from the previous step is dissolved in isopropyl alcohol (1.5 l.) and to the warm solution at 60° is added L-α-phenethylamine (96.8 g., 0.8 mole) in isopropyl alcohol (0.5 l.). A portion is removed, concentrated, diluted with ether, heated and cooled and scratched until seed crystals are obtained. The mixture is concentrated to half volume warmed to 50°, seeded and allowed to cool spontaneously and stand at 25° overnight. The mixture is further cooled to 5°, filtered, the precipitate washed with cold isopropyl alcohol and ether and dried *in vacuo* at room temperature. The L,L-salt is recrystallized twice from isopropyl alcohol to yield L-phenethylammonium L-β-(3,4 - diacetoxyphenyl)-α-N$^1$,N$^2$-diacetylhydrazinopropionate.

To water (600 ml.) and 2.5 N hydrochloric acid (40 ml.) is added salt (50.16 g., 0.1 mole) from the previous step and the mixture is stirred at 0–5° for 1 hour. An equal portion of 2.5 N hydrochloric acid is added and the mixture stirred at 0–5° for 1 hour more. The mixture is filtered and the precipitate washed with three 25 ml. portions of cold water. The residue is dried in air to obtain L-β-(3,4-diacetoxyphenyl) - α - N$^1$,N$^2$-diacetylhydrazinopropionic acid.

The ester (32.7 g., 0.085 mole) from the previous step is refluxed under nitrogen with 2 N hydrochloric acid (50 ml.) for 2 hours. The mixture is concentrated to dryness *in vacuo* to yield L-β-(3,4-dihydroxyphenyl)-α-hydrazinopropionic acid hydrochloride.

The hydrazino acid salt (24.87 g., 0.085 mole) of the previous step is absorbed on Amberlite IR–120® on the acid

cycle. The hydrazino acid is eluted from the resin by 1 N ammonium hydroxide. The eluate is concentrated to dryness *in vacuo* and the residue recrystallized from water to yield L-β-(3,4-dihydroxyphenyl) - α - hydrazinopropionic acid.

EXAMPLE 2

Preparation of L-β-(3,4-dihydroxyphenyl)-α-hydrazinopropionic acid

To L-tartaric acid (7.50 g., 0.05 mole) in methanol (50 ml.) is added at 50° L-β-(3,4-dihydroxyphenyl)-α-hydrazinopropionic acid (21.22 g., 0.1 mole) in methanol (100 ml.). The mixture is allowed to cool spontaneously. A portion is removed, concentrated, diluted with ether, heated and cooled and scratched until seed crystals are obtained. The seeds are used to seed the mixture which is allowed to stand overnight at 25°. The mixture is cooled to 0°, filtered, washed and dried to yield the L-tartaric acid salt of L-β-(3,4-dihydroxybenzyl)-α-hydrazinopropionic acid.

To D,L-β-(3,4-dihydroxyphenyl)-α-hydrazinopropionic acid (212.21 g., 1.0 mole) is added 2.5 N hydrochloric acid (200 ml.) and the mixture is concentrated to dryness *in vacuo*. The residue is taken up in methanol (1.4 l.) at 60°, L-tartaric acid (37.5 g., 0.25 mole) is added and dissolved and the mixture allowed to cool to 25°. The mixture is seeded with the tartrate salt previously obtained and allowed to stand overnight at 25°. The mixture is cooled to 0–5°, filtered, washed and the precipitate dried. The residue is recrystallized twice from methanol to yield L-tartaric acid salt of L-β-3,4-(dihydroxyphenyl)-α-hydrazinopropionic acid.

The tartrate salt (57.44 g., 0.1 mole) from the previous step is slurried with water (250 ml.) and with stirring and cooling 10 N sodium hydroxide is added to pH 6.4. The mixture is filtered, washed and the precipitate dried to yield L-β-(3,4-dihydroxyphenyl) - α - hydrazinopropionic acid.

EXAMPLE 3

Preparation of methyl-D,L-β-(3,4-dihydroxyphenyl)-α-hydrazinopropionate

To D,L-β-(3,4-dihydroxyphenyl) - α - hydrazinopropionic acid (212.21 g., 1.0 mole) in methanol (1 l.) is added at 0–5° gaseous hydrogen chloride until the mixture is saturated. After the mixture stands 24 hours at 20 to 25° it is concentrated to dryness *in vacuo*. The residue is taken up in 2 l. of methanol, sodium methoxide (27.01 g., 0.5 mole) is added, the mixture filtered and washed and the fitlrate concentrated to 2 l. To the concentrate is added d-camphoric acid (100.1 g., 0.50 mole). An aliquot is removed, ether added, the mixture warmed, cooled and the walls scratched to induce crystallization. The remainder of the solution is concentrated to half volume and seeded. The mixture is allowed to stand overnight at 25°, cooled to 0–5°, filtered and the precipitate washed with cold methanol. After drying the precipitate is recrystallized from isopropyl alcohol to yield the d-camphoric acid salt of methyl-L-β-(3,4-dihydroxyphenyl)-α-hydrazinopropionate.

The ester salt (63.94 g., 0.15 mole) from the previous step is refluxed under nitrogen with 2 N hydrochloric acid (100 ml.) for 2 hours. The mixture is cooled to 10–15°, basified to pH 6.4 with 10 N sodium hydroxide, filtered, the precipitate washed with water and dried. The residue is recrystallized from water to yield L-β-(3,4-dihydroxyphenyl)-α-hydrazinopropionic acid.

EXAMPLE 4

Preparation of L-α-hydrazino-α-vanillylpropionitrile D-10-camphorsulfonate

To a mixture of D,L-α-hydrazino-α-vanillylpropionitrile (221.26 g., 1.0 mole) in (1:1) tetrahydrofuran-methanol (2 liters) is added D-10-camphorsulfonic acid (116.16 g., 0.5 mole) in methanol (0.5 liter) and 7 N methanolic hydrochloric acid (143 ml.). A sample is removed, concentrated, heated, cooled and scratched to induce crystallization. The bulk of the material is concentrated to half volume, warmed to 50°, seeded and allowed to cool to room temperature. The mixture is cooled to 5°, filtered, washed with (1:1) methanol ether. The salt is recrystallized twice from methanol-ether to yield L-α-hydrazino - α - vanillylpropionitrile D-10-camphorsulfonate.

Preparation of L-α-(3,4-dihydroxybenzyl)-α-hydrazinopropionic acid

The salt (45.36 g., 0.1 mole) from the previous step is stirred with 45% hydrochloric acid (300 ml.) at 0 to −10°. The mixture is refluxed for 2 hours, concentrated to dryness *in vacuo* and the residue extracted with 500 ml. of ethyl acetate at 50°. The remaining solid is taken up in methanol and diethylamine is added to pH 6.4 and the mixture is filtered. The residue is dried and recrystallized from water containing 0.5% sodium bisulfite to yield L-α-(3,4-dihydroxybenzyl) - α - hydrazinopropionic acid.

The filtrate enriched in D-α-hydrazino-α-vanillylpropionitrile hydrochloride and D-10-camphorsulfonate is concentrated *in vacuo* to dryness. The residue is slurried with water and the pH adjusted to 8.5 by addition of sodium hydroxide. The mixture is filtered, washed with water and dried to yield D-enriched hydrazinonitrile.

The hydrazinonitrile of the previous step is stirred at 50° for 3 hours with water (300 ml.), 85% hydrazine hydrate (100 ml.) and potassium cyanide (32.6 g., 0.5 mole). The mixture is cooled to room temperature, filtered, the residue washed with three 75 ml. portions of cold water and three 75 ml. portions of ether and dried in air to yield DL-α-hydrazino-α-vanillylpropionitrile for recycling to the resolution.

Alternatively, the enriched D-hydrazinonitrile is refluxed at pH 8.5 in water for 2 hours. The mixture is cooled, extracted with benzene, the benzene extract dried (MgSO$_4$) and concentrated and distilled to yield 1-(4'-hydroxy-3'-methoxyphenyl)-2-propanone. This material is recycled to the preparation of DL-α-hydrazino-α-vanillylpropionitrile.

Many other equivalent modifications of the invention would be apparent to those skilled in the art from a reading of the foregoing without a departure from the inventive concept.

What is claimed is:

1. A diastereomer of a compound of the formula

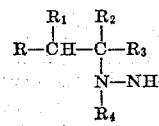

wherein

R is a 3,4-disubstituted phenyl radical wherein the substituents are acetoxy;

R$_1$ and R$_2$ are hydrogen or lower alkyl;

R$_3$ is —COOlower alkyl or —COOcation; and

R$_4$ and R$_5$ are hydrogen, benzoyl or lower alkanoyl with at least one group being hydrogen with an optically active acid selected from the group consisting of camphoric acid, dibenzoyltartaric acid, ditolyltartaric acid, malic acid, α-methyl-α-phenylacetic acid, and atrolactic acid.

2. The diastereomer of Claim 1 in the crystalline form.

3. The diastereomer of Claim 1 wherein the compound of the structural formula is in the L-stereo configuration.

References Cited

UNITED STATES PATENTS

| | | | |
|---|---|---|---|
| 3,470,233 | 9/1969 | Bohn et al. | 260—519 |
| 3,440,279 | 4/1969 | Sugimoto et al. | 260—519 |
| 3,517,049 | 6/1970 | Suranyi et al. | 260—519 |

LORRAINE A. WEINBERGER, Primary Examiner

L. H. THAXTON, Assistant Examiner

U.S. Cl. X.R.

260—479 R